Aug. 15, 1961  A. KLAR  2,996,606
SAFETY HEAD AND SIDE LAMPS FOR MOTOR VEHICLES
Filed June 21, 1960  2 Sheets-Sheet 1

INVENTOR.
ADOLPH KLAR
BY
ATTORNEY

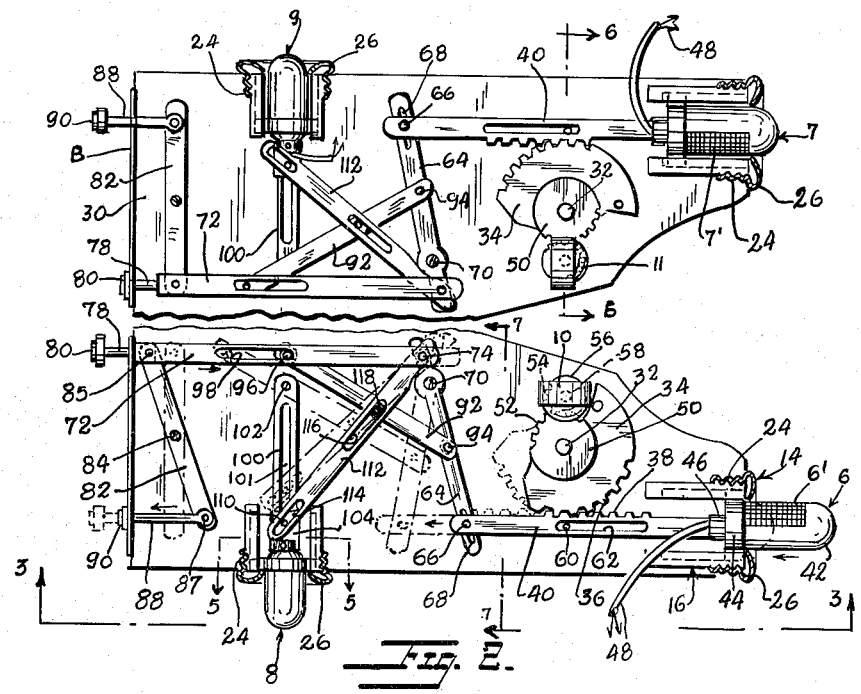
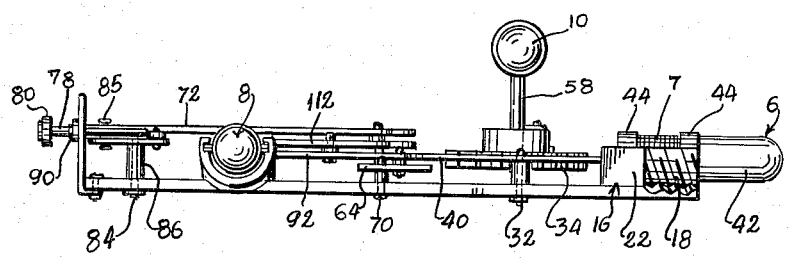
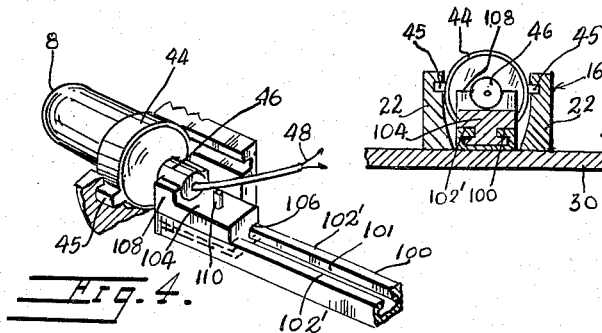

United States Patent Office 2,996,606
Patented Aug. 15, 1961

2,996,606
SAFETY HEAD AND SIDE LAMPS
FOR MOTOR VEHICLES
Adolph Klar, 436 Woodmere Blvd., Woodmere, N.Y.
Filed June 21, 1960, Ser. No. 37,727
4 Claims. (Cl. 240—7.1)

This invention relates to an improved means for mounting and operating headlamps and sidelamps of vehicles such as automobiles, trucks, buses and the like.

Many accidents have resulted from the driving of vehicles such as automobiles, trucks and buses to side roads or places believed to be suitable for safe driving or parking, when there was insufficient illumination of the area to reveal hazardous conditions. Conventional headlamps of vehicles are fixed in place to project light rays forwardly and when the road over which a vehicle travels has been obstructed by landslides, construction work, or wrecked vehicles, it becomes necessary to detour to open country or to a side road, which may be hazardous and lead to a deep pit, mud hole or flooded area in which further travel in any direction is difficult or impossible.

The present invention is directed at forestalling such situations, by providing vehicle headlamps and sidelamps which are normally retracted in the vehicle and which can be extended to illuminate areas on both sides of the vehicle so that the driver can have a full view of such side areas to avoid hazardous road conditions there.

A further object of the invention is to provide an assembly of vehicle headlamps and sidelamps provided with a manually operable linkage for projecting and retracting the lamps under control of the driver in the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 2 is a fragmentary plan view of the lamp and linkage assemblage of FIG. 1, parts being broken away.

FIG. 3 is a side elevational view of the apparatus of FIG. 2 as seen from the line 3—3 of FIG. 2, parts being omitted.

FIG. 4 is a perspective view of part of a lamp and linkage assembly, parts being omitted and parts being broken away.

FIG. 5 is a cross-sectional view taken on the line 5—5 of FIG. 2.

Figure 1:
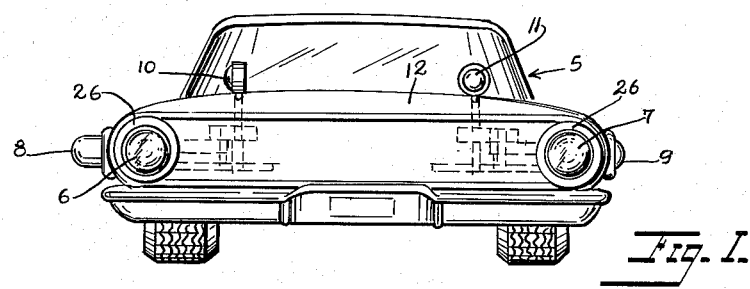
FIG. 1 is a front view of an automobile equipped with lamp and linkage assemblies embodying the present invention.
Figure 6:
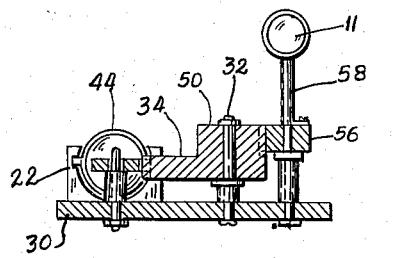
FIG. 6 is a vertical sectional view taken on the line 6—6 of FIG. 2.
Figure 7:
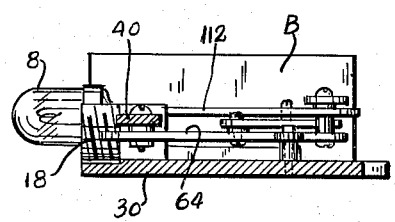
FIG. 7 is a vertical sectional view taken on the line 7—7 of FIG. 2.
Figure 8:
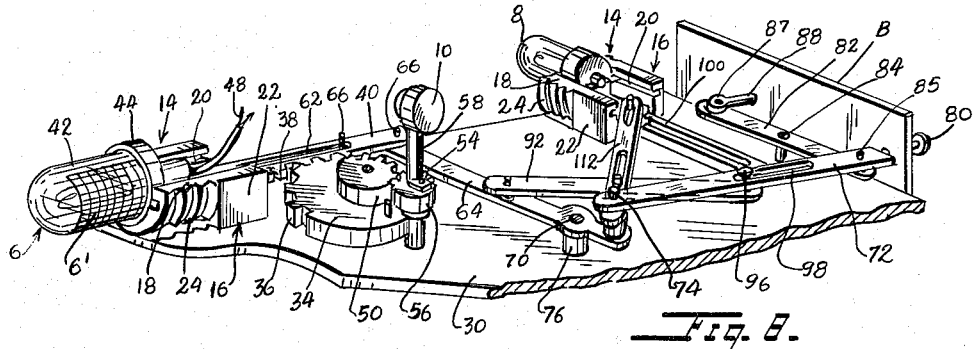
FIG. 8 is a fragmentary top perspective view of the lamp and linkage assemblage.

Referring in detail to the drawings, in FIG. 1 an automobile 5 is shown equipped with lamp and linkage assemblage made in accordance with the present invention. The lamp and linkage assemblage includes front headlights or lamps 6 and 7, sidelights or lamps 8 and 9 and rotatable lamps 10 and 11 extending upwardly from the front hood 12. The front lamps 6 and 7 are each formed with an opaque portion 6' and 7', respectively, on one side thereof. The lamps 6, 8 and 10 on the right-hand side of the automobile are shown in moved position.

Each lamp is slidably supported in a cradle socket structure 14 consisting of a channel-shaped block 16 having an externally screw-threaded cylindrical extension 18 and opposed grooves 20 in the side walls 22 thereof. A sleeve member 24 is threaded over each extension and has an outer peripheral flange 26 which protrudes outwardly of the hood.

The lamp and linkage assemblage comprises generally a rectangular-shaped supporting plate 30 suitably mounted on the chassis of the automobile. A post 32 protrudes upwardly from the plate and rotatably mounted on said post is a sector gear 34 having teeth 36 engaged with teeth 38 on a rack gear. The rack gear is an elongated metal bar 40 extending longitudinally in a fore and aft direction with respect to the automobile 5. At the forward end of the bar 40, the lamp 6 is mounted in socket structure 14 thereat. The lamp includes a globe 42 seated in a circular socket portion 44 having a base and centrally extending cylindrical extension 46 with a central bore for receiving the conductors 48. The circular socket portion 44 is formed with opposed laterally protruding lugs 45. A spur gear 50 smaller than gear 34 is carried on shaft 32 and has teeth 52 engaged with teeth 54 of a spur gear 56 carried on a shaft 58 journalled in base plate 30. At the upper end of the shaft 58 there is mounted the lamp 10 which is rotatable 90° between forwardly facing and laterally inward facing positions.

A pin 60 extending upwardly from the base plate 30 extends through a slot 62 in the bar 40 and serves to guide and to constrain the bar in its longitudinal movement on the plate 30. A link member 64 is pivotally fastened at one end to the rear end of the bar 40 by means of a pivot pin 66, extending through an elongated slot 68 in the end of the link member 64. The link member 64 is pivotally mounted on a fixed pivot pin 70 adjacent its other end, extending up from the plate 30, which other end is pivotally secured to the inner or forward end of another flat bar 72 by a pivot pin 74. The link member 64 is disposed perpendicularly to bar 40 and is spaced from the plate by a sleeve 76 around the pivot pin 70. Bar 72 is disposed parallel to bar 40.

The bar 72 terminates in its outer end in a handle bar 78 extending through a slot in an instrument board B in front of the driver's seat in the automobile. Handle bar 78 is provided with a handle 80 for extending and retracting the bar 72.

Another flat bar 82 is pivotally mounted on the plate 30 by means of a pivot pin 84 and is spaced from the plate by a sleeve 86 around the pin 84. One end of bar 82 is pivotally secured to the end of the bar 72 by means of a pivot pin 85 and has its other end pivotally secured by a pivot pin 87 to the end of a lever bar 88 extending through a slot in the instrument board. Lever bar 88 is provided with a handle 90 whereby the bar 82 may be moved for moving bar 72. An additional or extra handle is thus provided for moving the bar 72 in case the handle 80 is not convenient. The bar 82 may, however, be omitted if desired.

A connecting link 92 is interposed between the bars 64 and 72 to provide a balanced movement. Link 92 has one end pivotally secured to bar 64 by a pivot pin 94 and its other end carries a pin 96 riding in a slot 98 formed in bar 72.

Another bar 100 disposed perpendicularly to the bar 72 is secured to the plate 30 by screws 102 at each end thereof. Bar 100 is formed with a central groove 101 opening upwardly and forming flanges 102' along the elongated edges of the bar. A block 104, with opposed grooves 106 in its sides, is slidably mounted on the bar and slidable therealong, with the flanges 102 riding in the grooves 106. One end of the block is provided with a cradle-like enlargement 108 adapted to frictionally grasp the cylindrical extension 46 of the socket member 44 of sidelamp 8 and carry the lamp along with the block. A pin 110 protrudes upwardly from the block.

A flat lever bar 112 has one end pivotally connected to the pivot pin 74 connecting the ends of bars 64 and 72 and has its other end slotted as indicated at 114 and connected to the pin 110 on the block 104 for moving the block. Intermediate its ends, the bar 112 is formed with a slot 116 for interlocking with a pin 118 carried by bar 92.

The lamp and linkage assemblage on one side of the automobile including the front lamp 6, side lamp 8 and hood lamp 10 has just been described which is adapted for illuminating the road at the front and to the right of the vehicle as viewed in FIG. 1. The lamp and linkage assemblage on the other side of the automobile including the front lamp 7, side lamp 9 and hood lamp 11 is exactly the same and is shown in FIG. 2 in mirror image fashion for illuminating the road at the front and to the left of the vehicle. Similar reference numerals are used to indicate similar parts on both sides as viewed in FIG. 1, except the numerals for identifying the lamps.

In operation of the assembly, lamps 6 and 7 will be retracted rearwardly and lamps 10, 11 will face each other in opposing lateral positions, that is, lamp 10 will face to the left and lamp 11 will face to the right. Lamps 8 and 9 will be retracted inwardly. Suppose now that handle 80 on the right side of the instrument board B is pulled rearwardly, or handle 90 thereat is pushed forwardly to the positions shown in FIG. 1. This will retract bar 72 causing link 64 to pivot counterclockwise when viewed in plan from above and pushing bar 40 forwardly. Thus, lamp 6 will be extended beyond the front end of the base plate 30 and vehicle 5. At the same time, lamp 10, normally facing forwardly, rotates on shaft 58 to a side facing position since gear 56 is rotated 90° by gear 50 which in turn is rotated with shaft 32 as rack gear 40 moves forwardly to turn gear 34. Lamp 8 is moved laterally outwardly while bar 72 is moving forwardly since link 112 moves angularly in a counterclockwise direction viewed from above in plan to advance the block 102 outwardly to the right.

When lamp 6 moves forwardly, it effectively lights up an area in front of the vehicle and an area at the right-hand side of the road just in front of the vehicle. Lamp 8 illuminates an area at the side of the road along the right side of the vehicle. Lamp 10 also illuminates the road to the right of the vehicle.

When the handle 80 or 90 on the left-hand side of the instrument board B is actuated, lamps 7, 9 and 11 are moved in similar manner. The lamps 9 and 11 illuminate the left-hand side of the road and the lamp 7 illuminates an area in front of the vehicle and an area to the left in front of the vehicle.

The base plate 30 will preferably be mounted under the hood 12 of the vehicle. Openings (not shown) are provided in the body of the vehicle through which the lamps can be extended and retracted. The lamps 6, 7, 8 and 9 can be retracted into the body when not in use. The lamps 10 and 11 may be used to supplement or replace the regular headlamps of the vehicle.

It will be understood that the mechanism could be electrically actuated by operatively connectnig the shafts 78 and 88 to an electrically actuated device.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A safety roadside illumination device for a vehicle, comprising a base plate, a first lamp mounted on the base plate and movable in fore and aft directions thereon, a second lamp movably mounted on the base plate and movable in lateral directions perpendicular to the fore and aft directions, a third lamp angularly rotatable on the base plate between laterally facing and forwardly facing positions, linkage means disposed on said base plate and operatively connected to the lamps for moving the same, and means for actuating the linkage means to move the first and second lamps between extended and retracted positions on the base plate and to rotate said third lamp between the laterally and forwardly facing positions, said actuating means including a handle, said linkage means including a first bar connected to the first lamp, a slidable block connected to the second lamp, an operating bar connected to said handle and extending rearwardly of the base plate for manual operation by said handle, a first link connected between the first bar and said operating bar and movable angularly to move the first bar and first lamp in the fore and aft directions, and a second link connected between the operating bar and slidable block to move the block and second lamp in lateral directions, said first bar including a rack gear, a sector gear meshed with the rack gear, a first spur gear rotatable with the sector gear, a shaft, a second spur gear carried by said shaft and meshed with the spur gear, said third lamp being mounted on said shaft whereby 90° rotation of the sector gear by said rack gear causes said shaft and third lamp to turn through 90°.

2. A safety roadside illumination device for a vehicle, comprising a base plate, a pair of lamp and linkage assemblies on the base plate disposed in laterally spaced positions, each of said assemblies including a first lamp mounted on the base plate and movable in fore and aft directions thereon, a second lamp movably mounted on the base plate and movable in lateral directions perpendicular to the fore and aft directions, a third lamp angularly rotatable on the base plate between laterally facing and forwardly facing positions, linkage means disposed on said base plate and operatively connected to the lamps for moving the same, and means for actuating the linkage means to move the first and second lamps between extended and retracted positions on the base plate and to rotate said third lamp between the laterally and forwardly facing positions, said actuating means including a handle, whereby one of said assemblies illuminates an area to the right of said plate and the other assembly illuminates an area to the left of said plate when the first and second lamps are in extended positions with respect to the base plate, said linkage means including a first bar connected to the first lamp, a slidable block connected to the second lamp, an operating bar connected to said handle and extending rearwardly of the base plate for manual operation by said handle, guide means constraining the first bar and block to move in longitudinal and lateral directions, respectively, on the base plate, a first link connected between the first bar and said operating bar and movable angularly to move the first bar and first lamp in the fore and aft directions, and a second link connected between the operating bar and slidable block to move the block and second lamp in lateral directions.

3. A safety roadside illumination device for a vehicle, comprising a base plate, a pair of lamp and linkage assemblies on the base plate disposed in laterally spaced positions, each of said assemblies including a first lamp mounted on the base plate and movable in fore and aft directions thereon, a second lamp movably mounted on the base plate and movable in lateral directions perpendicular to the fore and aft directions, a third lamp angularly rotatable on the base plate between laterally facing and forwardly facing positions, linkage means disposed on said base plate and operatively connected to the lamps for moving the same, and means for actuating the linkage means to move the first and second lamps between extended and retracted positions on the base and to rotate said third lamp between the laterally and forwardly facing positions, said actuating means including a handle, whereby one of said assemblies illuminates an area to the right of the vehicle and the other assembly illuminates an area to the left of the vehicle when the first and second lamps are in extended positions with respect to the base plate, said linkage means including a first bar connected to the first lamp, a slidable block connected to the second lamp, an operating bar connected to said handle and extending rearwardly of the base plate for manual operation, respectively, a first link connected between the first bar and said operating bar and movable angularly to move the first bar and first lamp in the fore and aft directions, and a second link connected between the operating bar and slidable block to move the block and second lamp in lateral directions, said first bar including a rack gear, a sector gear meshed with the rack gear, a first spur gear rotatable with the sector gear, a shaft, a second spur gear carried by said shaft and meshed with the spur gear, said third lamp being mounted on said shaft whereby 90° rotation of the sector gear by said rack gear causes said shaft and third lamp to turn through 90°.

4. A safety roadside illumination device for a vehicle, comprising a base plate, a pair of lamp and linkage assemblies on the base plate disposed in laterally spaced positions, each of said assemblies including a first lamp mounted on the base plate and movable in fore and aft directions thereon, a second lamp movably mounted on the base plate and movable in lateral directions perpendicular to the fore and aft directions, a third lamp angularly rotatable on the base plate between laterally facing and forwardly facing positions, linkage means disposed on said base plate and operatively connected to the lamps for moving the same, and means for actuating the linkage means to move the first and second lamps between extended and retracted positions on the base and to rotate said third lamp between the laterally and forwardly facing positions, said actuating means including a handle, whereby one of said assemblies illuminates an area to the right of the vehicle and the other assembly illuminates an area to the left of the vehicle when the first and second lamps are in extended positions with respect to the base plate, said linkage means including a first bar connected to the first lamp, a slidable block connected to the second lamp, an operating bar connected to said handle and extending rearwardly of the base plate for manual operation, respectively a first link connected between the first bar and said operating bar and movable angularly to move the first bar and first lamp in the fore and aft directions, and a second link connected between the operating bar and slidable block to move the block and second lamp in lateral directions, said first bar including a rack gear, a sector gear meshed with the rack gear, a first spur gear rotatable with the sector gear, a shaft, a second spur gear carried by said shaft and meshed with the spur gear, said third lamp being mounted on said shaft whereby 90° rotation of the sector gear by said rack gear causes said shaft and third lamp to turn through 90°, and a lever bar pivotally mounted on the base plate with one end pivotally connected to the rear end of the operating bar and a handle on the other end of said lever bar extending rearwardly of the base plate for manual operation of the operating bar.

References Cited in the file of this patent

UNITED STATES PATENTS

| | | |
|---|---|---|
| 1,640,738 | Taylor | Aug. 30, 1927 |
| 2,557,872 | Holland | June 19, 1951 |
| 2,796,515 | Waskie | June 18, 1957 |
| 2,804,539 | Robbins | Aug. 27, 1957 |
| 2,947,856 | Fox | Aug. 2, 1960 |